(12) United States Patent
Modai et al.

(10) Patent No.: US 8,212,856 B2
(45) Date of Patent: Jul. 3, 2012

(54) METHODS, MEDIA, AND DEVICES FOR PROVIDING VISUAL RESOURCES OF VIDEO CONFERENCE PARTICIPANTS

(75) Inventors: Ori Modai, Ramat-Hashron (IL); Eli Doron, Ganey Tikva (IL)

(73) Assignee: Radvision Ltd., Tel Aviv (IL)

( * ) Notice: Subject to any disclaimer, the term of this patent is extended or adjusted under 35 U.S.C. 154(b) by 1358 days.

(21) Appl. No.: 11/803,608

(22) Filed: May 15, 2007

(65) Prior Publication Data

US 2008/0284841 A1 Nov. 20, 2008

(51) Int. Cl.
*H04N 7/14* (2006.01)

(52) U.S. Cl. .................... 348/14.12; 348/14.01

(58) Field of Classification Search ............... 348/14.08, 348/14.09, 14.01–14.16; 379/202.01
See application file for complete search history.

(56) References Cited

U.S. PATENT DOCUMENTS

| | | | |
|---|---|---|---|
| 7,185,054 | B1 | 2/2007 | Ludwig et al. |
| 2003/0202008 | A1 | 10/2003 | McDonald et al. |
| 2004/0128350 | A1 | 7/2004 | Topfl |
| 2005/0144233 | A1 | 6/2005 | Kjesbu |
| 2005/0212908 | A1 | 9/2005 | Rodman |
| 2005/0213736 | A1 | 9/2005 | Rodman |
| 2005/0213739 | A1 | 9/2005 | Rodman |
| 2006/0092269 | A1 | 5/2006 | Baird |
| 2006/0126812 | A1 | 6/2006 | Carlson |
| 2006/0168529 | A1 | 7/2006 | Rokosz |
| 2006/0245379 | A1 | 11/2006 | Abuan |
| 2007/0046775 | A1 | 3/2007 | Ferren |

FOREIGN PATENT DOCUMENTS

| | | |
|---|---|---|
| CA | 2 204 001 A1 | 3/2007 |
| GB | 2 351 216 A1 | 12/2000 |
| WO | 01/67759 A2 | 9/2001 |

OTHER PUBLICATIONS

WO 97/08879. Terminal. Mar. 6, 1997. Weishut, Gideon et al.*

The International Search Report and the Written Opinion of the International Searching Authority, International Patent Application No. PCT/IL08/000660, Aug. 27, 2008.

* cited by examiner

*Primary Examiner* — Brian Ensey
(74) *Attorney, Agent, or Firm* — Byrne Poh LLP

(57) ABSTRACT

Methods, media, and devices for providing visual resources of video conference participants are provided. In some embodiments, methods for providing a visual resource of a participant to a video conference comprise: determining that the participant is joining or departing the video conference; accessing a visual resource that identifies the participant; and presenting the visual resource to at least one other participant to the video conference.

51 Claims, 4 Drawing Sheets

METHODS, MEDIA, AND DEVICES FOR PROVIDING VISUAL RESOURCES OF VIDEO CONFERENCE PARTICIPANTS

TECHNICAL FIELD

The disclosed subject matter relates to methods, media, and devices for providing visual resources of video conference participants.

BACKGROUND

Video conferencing systems are in wide-spread use and enable participants who may be in vastly different geographical locations to have face-to-face meetings without the need to travel great distances. When participating in such conferences, it is desirable to know when new participants join the conference, to see the video of the participants throughout the conference, and to be able to determine who is on the conference at any time during the conference.

In prior systems, new participants to a call have been announced using the audio portion of the conference. While this can be an effective way to announce who is joining, it can also be very distracting to those who are listening to a speaking participant. Also, in prior systems, when the video of a participant became degraded or was not present, the video would simply be displayed in degraded form or omitted entirely. In many case, this made it impossible to determine who was speaking when a listener was not familiar with a speaker's voice. Similarly to new-participant announcements, when a roll call was performed in prior systems, the participants would be announced in the audio portion of the conference, which, as described above, can be distracting to listening participants.

Therefore, in accordance with various embodiments, it is desirable to provide video conferencing systems which overcome these limitations of prior systems.

SUMMARY

Methods, media, and devices for providing visual resources of video conference participants are provided. In some embodiments, methods for providing a visual resource of a participant to a video conference comprise: determining that the participant is joining or departing the video conference; accessing a visual resource that identifies the participant; and presenting the visual resource to at least one other participant to the video conference.

In some embodiments, methods for providing a visual resource of a participant to a video conference comprise: determining whether video of the participant is degraded or not present; accessing a visual resource that corresponds to the participant when the video is degraded or not present; and presenting the visual resource to at least one other participant to the video conference.

In some embodiments, methods for providing visual resources of participants to a video conference comprise: waiting for a roll call to be initiated; creating a video roll call of the participants to the video conference that includes a visual resource for each of the participants; and displaying the video roll call.

In some embodiments, computer-readable media containing computer-executable instructions that, when executed by a processor, cause the processor to perform a method for providing a visual resource of a participant to a video conference. The method comprising: determining that the participant is joining or departing the video conference; accessing a visual resource that identifies the participant; and presenting the visual resource to at least one other participant to the video conference.

In some embodiments, computer-readable media containing computer-executable instructions that, when executed by a processor, cause the processor to perform a method for providing a visual resource of a participant to a video conference. The method comprising: determining whether video of the participant is degraded or not present; accessing a visual resource that corresponds to the participant when the video is degraded or not present; and presenting the visual resource to at least one other participant to the video conference.

In some embodiments, computer-readable media containing computer-executable instructions that, when executed by a processor, cause the processor to perform a method for providing visual resources of participants to a video conference. The method comprising: waiting for a roll call to be initiated; creating a video roll call of the participants to the video conference that includes a visual resource for each of the participants; and displaying the video roll call.

In some embodiments, devices for providing a visual resource of a participant to a video conference, comprising: a processor that determines that the participant is joining or departing the video conference, accesses a visual resource that identifies the participant, and presents the visual resource to at least one other participant to the video conference.

In some embodiments, devices for providing a visual resource of a participant to a video conference, comprising: a processor that determines whether video of the participant is degraded or not present, accesses a visual resource that corresponds to the participant when the video is degraded or not present, and presents the visual resource to at least one other participant to the video conference.

In some embodiments, devices for providing visual resources of participants to a video conference, comprising: a processor that waits for a roll call to be initiated, creates a video roll call of the participants to the video conference that includes a visual resource for each of the participants, and causes the video roll call to be displayed.

DETAILED DESCRIPTION

Methods, media, and devices for providing visual resources of video conference participants are provided. These indications may include one or more visual resources, which may be any suitable mechanism for visually identifying the participant in a video conference to other participants in the video conference. For example, a visual resource may be a video clip, an image, an avatar, an icon, an animation, etc. A visual resource may be obtained from any suitable source. For example, the visual resource may be an image or a video clip captured from a conference participant's end-point automatically or in response to a request from the participant. In some embodiments, a user interface may indicate a countdown to when an image will be captured and may allow a participant to select from multiple captured images or clips.

In some embodiments of the disclosed subject matter, a visual resource of a participant may be presented upon the participant joining a conference. In some embodiments, a visual resource of a participant may be presented upon a video of the participant becoming degraded or not being present. In some embodiments, visual resources of one or more participants to a conference may be presented as part of a video roll call.

Figure 1:
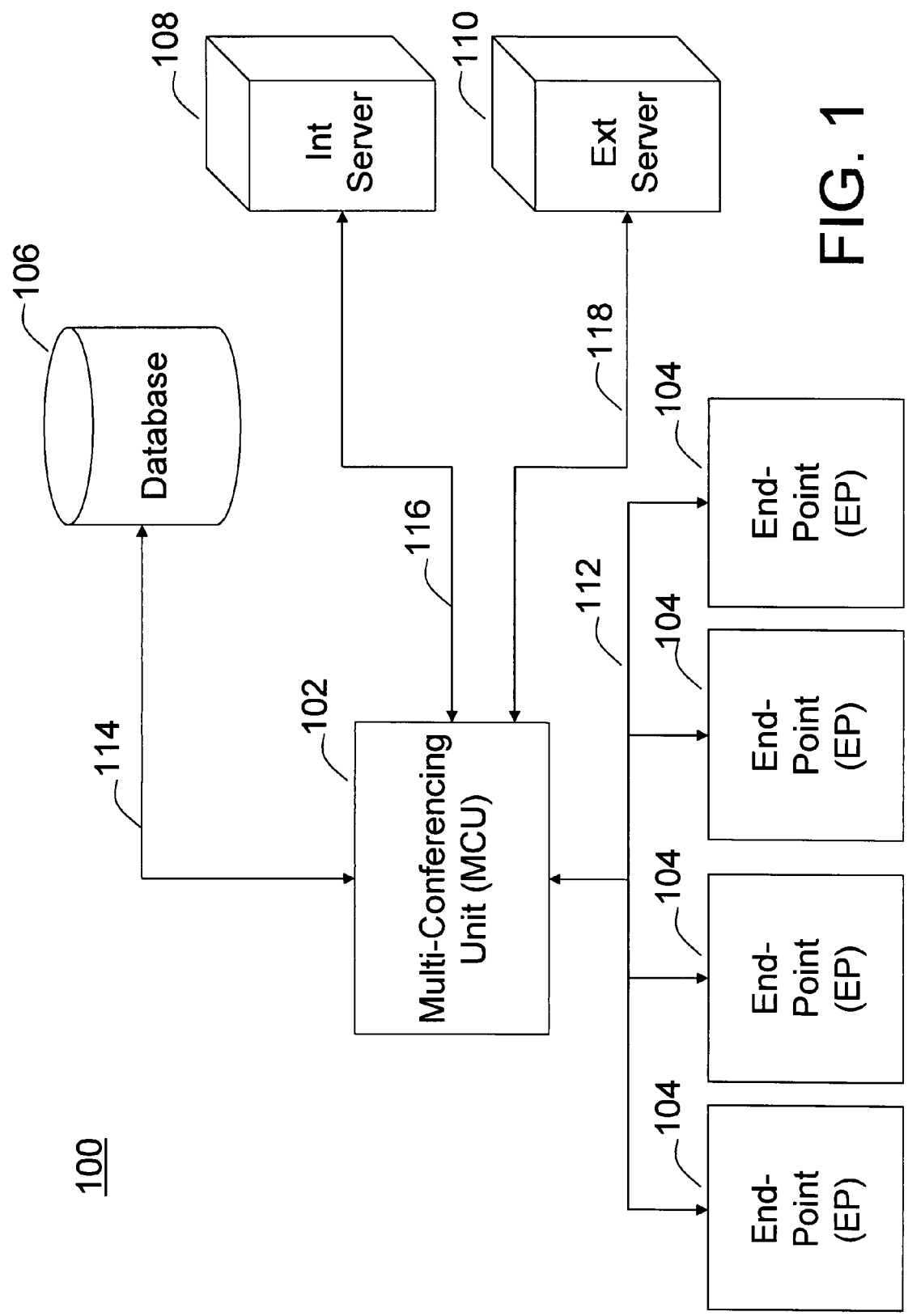
FIG. 1 is a block diagram of a system that may be used in accordance with some embodiments.

Turning to FIG. 1, a system 100 for implementing various embodiments of the invention is shown. As illustrated, system 100 may include a multi-conferencing unit (MCU) 102, end-points 104, a database 106, an internal server 108, an external server 110, and connections 112, 114, 116, and 118.

Multi-conferencing unit (MCU) 102 may be any suitable device for hosting a video conference. In some embodiments, MCU 102 may be embedded in one of end-points 104. As described below, MCU 102 may perform one or more of the functions described in connection with FIGS. 2-4 in addition or alternatively to other multi-conferencing unit functions. MCU 102 may be implemented using any suitable equipment, such as dedicated hardware or a general purpose computer, and may include one or more processors and interfaces.

End-points 104 may be any suitable devices for providing a user interface for a voice or video conference. Some of end-points 104 may be only capable of hosting the voice portion of a conference, or a part of the video portion of a conference (e.g., only display images of remote participants but not transmit an image of a local participant, or only transmit an image of a local participant but not display images of remote participants). At least one of end-points 104 may have the ability to display visual resources that are part of a video conference hosted by MCU 102.

Each of database 106, internal server 108, and external server 110 may be any suitable devices for storing visual resources. These visual resources may be accessed by MCU 102 and used as part of a video conference, as described below.

Database 106, for example, may be any suitable storage device, such as memory (e.g., random access memory, read only memory, FLASH memory, etc.), a disk drive, an optical media drive (e.g., compact disc, digital video disc, etc.), and may incorporate any suitable logic for enabling MCU 102 to access visual resources stored thereon. Database 106 may be incorporated into or separate from MCU 102, and may be coupled to MCU 102 by connection 114, which may be any suitable mechanism for connecting database 106 to MCU 102 (such as one or more wires, a computer network, a communication network, etc.).

Internal server 108 and/or external server 110, for example, may be a digital processing device (such as a computer, a server, a network appliance, etc.) containing any suitable storage device, such as memory (e.g., random access memory, read only memory, FLASH memory, etc.), a disk drive, an optical media drive (e.g., compact disc, digital video disc, etc.), and may incorporate any suitable logic for enabling MCU 102 to access visual resources stored thereon. Internal server 108 may be incorporated into MCU 102, and connected to MCU by connection 116. External server 110 may be external to MCU 102 and connected to MCU by connection 118. Connections 116 and/or 118 may be any suitable mechanism for connecting server 108 or 110 to MCU 102 (such as one or more wires, a computer network, a communication network, etc.).

Additionally or alternatively, visual resources may be stored in end-points 104. In such case, end-points 104 may include any suitable storage device, such as memory (e.g., random access memory, read only memory, FLASH memory, etc.), a disk drive, an optical media drive (e.g., compact disc, digital video disc, etc.), and may incorporate any suitable logic for enabling MCU 102 to access visual resources stored thereon.

Figure 2:
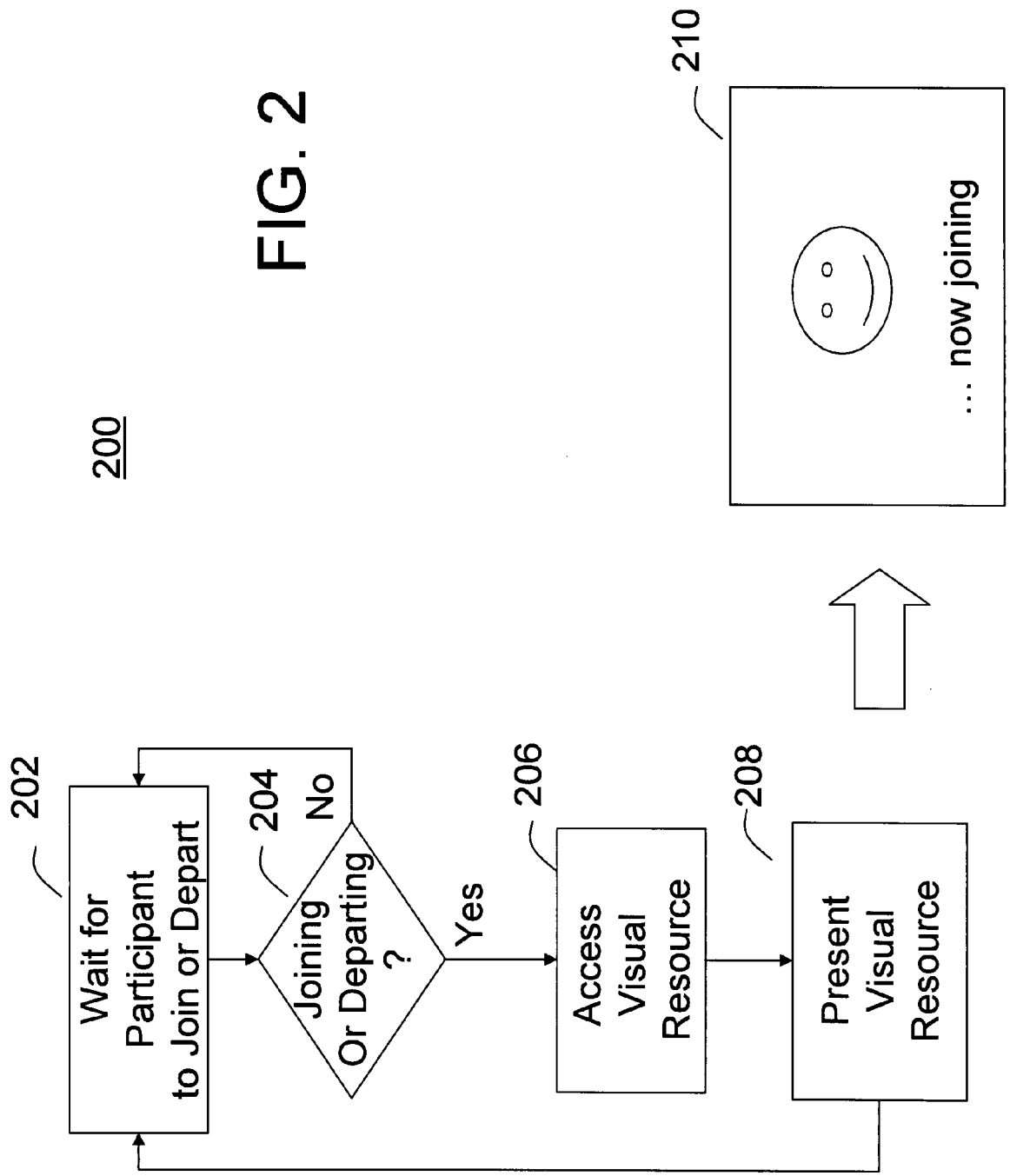
FIG. 2 is a diagram of a process that may be used to indicate when a new participant has joined a conference in accordance with some embodiments.

Referring to FIG. 2, a process 200 for indicating that a new participant is joining or leaving a conference in accordance with some embodiments is shown. The participant may be joining or leaving the conference using any suitable end-point 104, such as a voice-only end-point 104 or a voice-and-video end-point 104.

As shown, at 202, process 200 may wait for the participant to join or leave. Any suitable delay may be used in waiting, or 202 may be omitted in some embodiments. Next, at 204, process 200 may determine whether the participant has joined or left. This determination may be made using any suitable mechanism. For example, process 200 may determine that a participant has joined or left based on a participant code, user identification code, personal identification number, etc. entered by the participant, a telephone number from which the participant is calling into the conference (e.g., using "caller id"), an Internet Protocol (IP) address of the participant, a resource indication passed as a URL or file name, and/or any other suitable mechanism.

If process 200 determines that a participant has not joined or left, process 200 may loop back to 202 and once again wait for a participant to join or leave. If process 200 determines that a participant has joined or left, however, then process 200 may access a visual resource associated with the participant at 206. As described above, the visual resource may be any suitable mechanism for identifying the participant visually to other participants on the video conference. For example, a visual resource may be a video clip, an image, an avatar, an icon, an animation, etc. The visual resource may be stored on one or more of a database (such as database 102), an internal server (such as server 108), an external server (such as server 110), and/or any other suitable storage mechanism. The particular visual resource selected for a participant may be selected based on any suitable mechanism. For example, the visual resource may be selected based on a participant code, user identification code, personal identification number, etc. entered by the participant, a telephone number from which the participant is calling into the conference (e.g., using "caller id"), an Internet Protocol (IP) address of the participant, and/or any other suitable mechanism. Additionally or alternatively, other criterion or criteria may be used to select the visual resource, such as who the participant is conferencing with, what the conference is about, when the conference is taking place, etc. For example, a different visual resource may be selected when the participant is talking to colleagues from work versus personal friends. As another example, the visual resource may be determined based on a subject or title associated with the conference. As yet another example, the visual resource may be determined based on whether the conference is taking place during business hours or not.

After the visual resource has been accessed at 206, the visual resource may be presented to other participants at 208. Prior to be presented, the visual resource may be resized, reformatted, etc. For example, as shown in window 210, an image of the participant may be presented along with an identifier of the participant's status, such as the words "now joining" or "now departing." This window may be presented on the entire display of one or more end-points 104 or may be presented on only a portion of the displays of end-points 104.

The window may have an opaque background (so as to obscure other images that are part of the conference), or may be any suitable level of transparency. The visual resource may additionally or alternatively include an identifier of the participant. For example, the identifier may be the name, nick name, company name, telephone number, IP address, etc. of the participant and/or any other suitable identifier. As a more particular example, the identifier may indicate "Jane is now joining." An audio identifier may additionally or alternatively be presented with the visual resource. The audio identifier may present through audio the identifier for the participant (e.g., a spoken name for the participant).

The window may be present until any suitable period of time has passed (e.g., 1 second) or until any suitable action has occurred (e.g., a viewer acknowledging the new participant by pressing a button).

After the visual resource is presented at 208, process 200 may loop back to 202 to wait for more participants.

Figure 3:
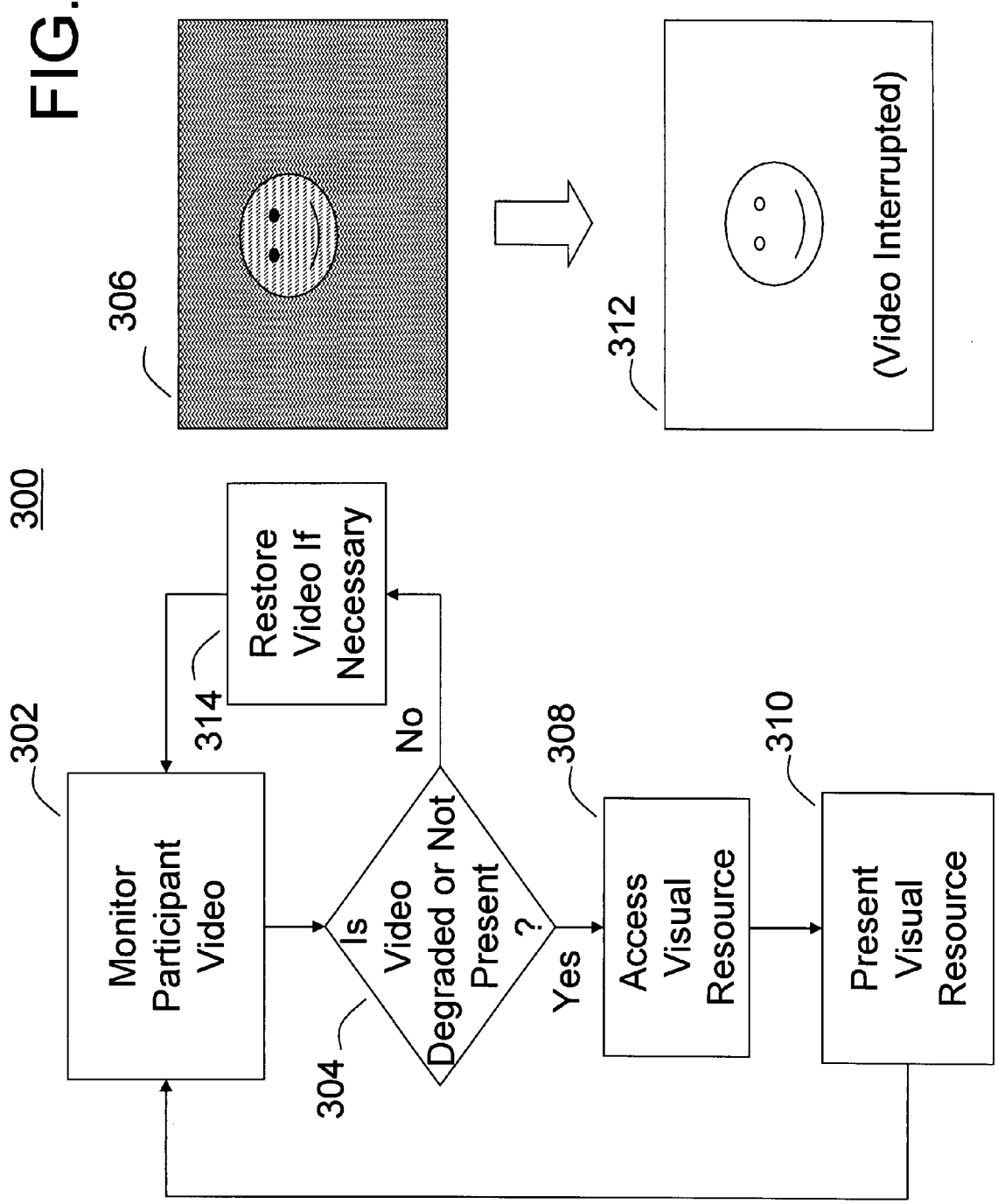
FIG. 3 is a diagram of a process that may be used when the video of a participant becomes degraded or is not present in accordance with some embodiments.

FIG. 3 illustrates a process 300 for presenting a visual resource when a participant's video has become degraded or is not present in accordance with some embodiments. As shown, at 302, process 300 monitors participant video(s). Next, at 304, process 300 determines whether a participant's video is degraded or not present. For example, as shown at 306, a participant's video may be degraded so that it causes the picture to look unsatisfactory. Such a degradation may occur for various reasons, including noise on the connection between the participant's end-point 104 and MCU 102 or technical problems with the participant's end-point 104. As another example, a participant's video may not be present because the participant has turned-off video at the participant's end-point, because the participant's end-point has no video capability, because of poor lighting at the participant's location, because of technical problems with the participant's end-point 104, and/or because of any other reason.

If it is determined at 304 that a participant's video is degraded or not present, then process 300 may access a visual resource at 308. The visual resource accessed at 308 may be the same or substantially the same as the visual resource described above in connection with 206 of FIG. 2, and the visual resource may be selected in the same or substantially the same manner as that described above in connection with 206 of FIG. 2.

After the visual resource has been accessed at 308, the visual resource may be presented to other participants at 310 instead of the participant's video. Prior to be presented, the visual resource may be resized, reformatted, etc. For example, as shown in window 312, an image of the participant may be presented along with the words "(Video Interrupted)." This window may be presented on the entire display of one or more end-points 104 (e.g., when full screen video is used for a speaking participant) or may be presented on only a portion of the displays of end-points 104 (e.g., as a portion of a composite video when multiple participants are simultaneously displayed in the composite video (e.g., in a "Hollywood Squares" manner). The visual resource may also include an identifier of the participant. For example, the identifier may be the name, nick name, company name, telephone number, IP address, etc. of the participant and/or any other suitable identifier. An audio identifier may additionally or alternatively be presented with the visual resource. The audio identifier may present through audio the identifier for the participant (e.g., a spoken name for the participant).

After the visual resource is presented at 310, process 300 may loop back to 302 to continue monitoring the participant's video.

If it is determined at 304 that the participant's video is not degraded and is present, then process 300 may restore the video if necessary (e.g., if a visual resource is being displayed instead of the participant's video) and loop back to 302.

Process 300 may be implemented as a thread for each participant, or process 300 may monitor the video of each participant.

Figure 4:
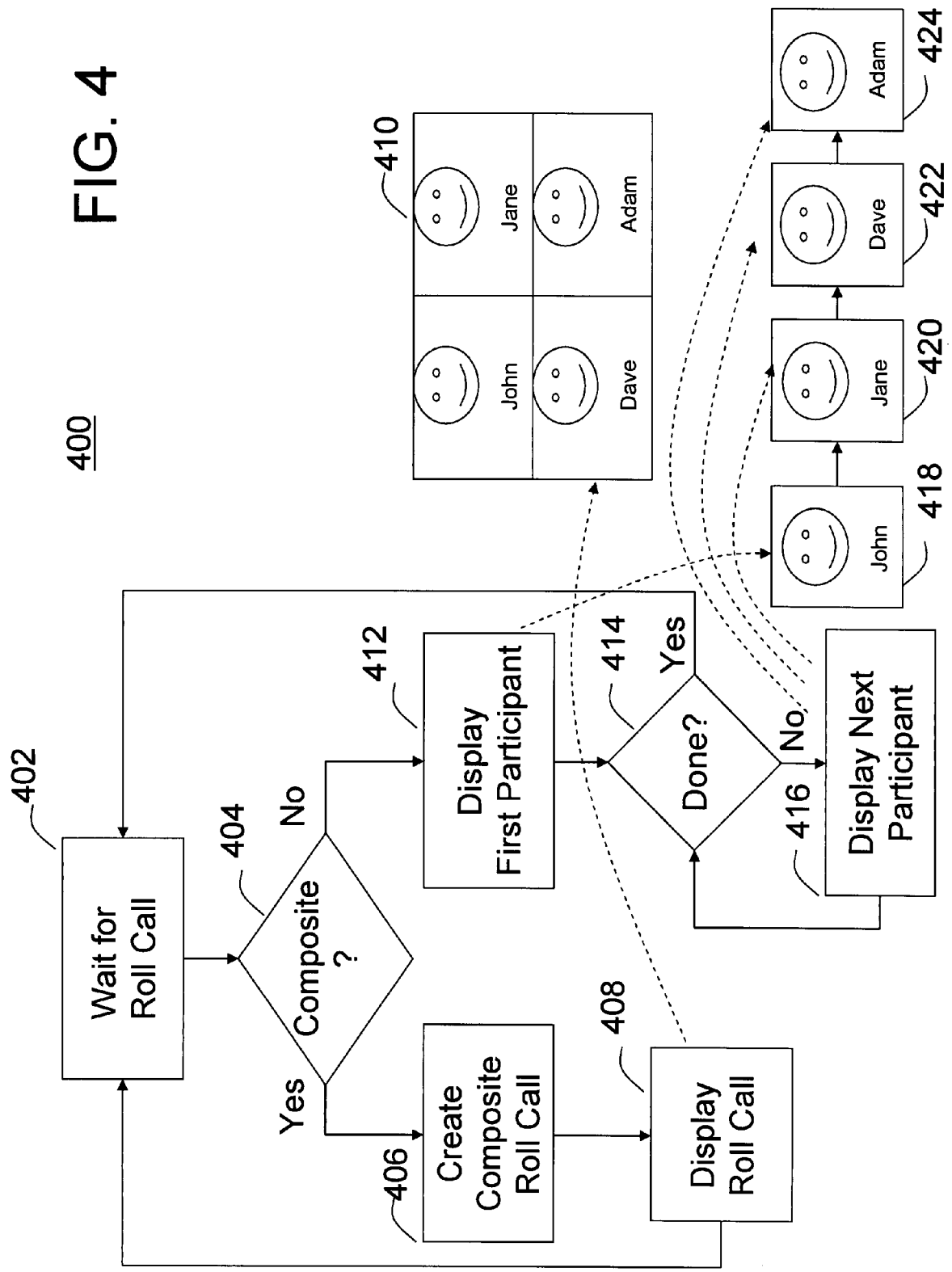
FIG. 4 is a diagram of a process that may be used to implement a video roll call in accordance with some embodiments.

FIG. 4 illustrates a process 400 for implementing a video roll call in accordance with some embodiments. A video roll call may be used to identify the participants to a conference using visual resources. As shown, at 402, process 400 may wait for a roll call to be initiated. For example, a roll call may be initiated automatically at the beginning of a conference, may be initiated in response to a participant request for a roll call, may be initiated when a participant joins or leaves a conference subsequent to the beginning of the conference, and/or based upon any other suitable criterion or criteria.

At 404, process 400 may determine whether the video roll call is to be presented in a composite fashion. If the video roll call is to be presented in a composite fashion, then process 400 may create a composite roll call at 406 and then display the composite roll call at 408. As shown in window 410, the composite roll call may display visual resources of the participants to a conference in a grid (e.g., in a "Hollywood Squares" manner). Prior to be included in the composite roll call, the visual resources may be resized, reformatted, etc. The visual resources included in the composite roll call may be the same or substantially the same as the visual resources described above in connection with 206 of FIG. 2, and may be selected in the same or substantially the same manner as described above in connection with 206 of FIG. 2. As shown, the composite roll call may also include identifiers of the participants. For example, the identifiers may be the names, nick names, company names, telephone numbers, IP addresses, etc. of the participants and/or any other suitable identifiers. An audio identifier may additionally or alternatively be presented with the composite roll call. The audio identifier may present through audio the identifier for each participant (e.g., a spoken name for each participant).

The composite roll call may be displayed until any suitable period of time has passed (e.g., 1 second) or until any suitable action has occurred (e.g., a viewer pressing a button). After the composite roll call is displayed at 408, process 400 may loop back to 402.

If it is determined at 404 that the video roll call is not a composite roll call, then process 400 may display a visual resource of a first participant at 412. Next, at 414, process 400 may determine whether the roll call is done (e.g., because the visual resources of all participants have been displayed). If it is determined that the roll call is not done, then the visual resource of the next participant may be displayed at 416 and process 400 may loop back to 414. If it is determined at 414 that the roll call is done, process 400 may loop back to 402.

The visual resources displayed at 412 and 416 may be the same or substantially the same as the visual resources described above in connection with 206 of FIG. 2, and may be selected in the same or substantially the same manner as described above in connection with 206 of FIG. 2. Prior to be displayed, the visual resource may be resized, reformatted, etc. The visual resources displayed at 412 and 416 may each be displayed until any suitable period of time has passed (e.g., 1 second) or until any suitable action has occurred (e.g., a viewer pressing a button).

An example of a video roll call that may be presented in accordance with 412, 414, and 416 is shown in windows 418, 420, 422, and 424. As shown in window 418, a visual resource for a first participant is displayed. This visual resource may also include an identifier for the participant as described above in connection with 410. An audio identifier may additionally or alternatively be provided as also described in connection with 410. Next, as shown in windows 420, 422, and 424, the visual resources for other participants may be displayed in sequence.

Windows 418, 420, 422, and 424 may be presented on the entire display of one or more end-points 104 or may be presented on only a portion of the displays of end-points 104. The windows may have opaque backgrounds (so as to obscure other images that are part of the conference), or may be any suitable level of transparency. The windows may be present until any suitable period of time has passed (e.g., 1 second) or until any suitable action has occurred (e.g., a viewer pressing a button).

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for providing resources of participants during video conferences, the method comprising:
    determining, using a hardware processor, that a participant using an endpoint is joining or departing the a video conference that includes other participants at a plurality of endpoints;
    accessing, using the hardware processor, a visual resource that identifies the participant in response to determining that the participant using the endpoint has joined the video conference;
    determining, using the hardware processor, that video of the participant associated with the endpoint is degraded; and
    presenting, using a hardware processor, the visual resource to at least one other participant by replacing the video of the participant during the video conference in response to determining that the video is degraded.

2. The method of claim 1, wherein the visual resource is an image.

3. The method of claim 1, wherein the visual resource is a video clip.

4. The method of claim 1, wherein the visual resource is an avatar.

5. The method of claim 1, further comprising modifying the visual resource.

6. A method for providing resources of participants during video conferences, the method comprising:
    determining, using a hardware processor, whether video of a participant is degraded;
    accessing, using hardware processor, a visual resource that corresponds to the participant in response to determining that video of the participant associated with an endpoint is degraded; and
    presenting, using the hardware processor, the visual resource to at least one other participant by replacing the video of the participant during the video conference.

7. The method of claim 6, wherein the visual resource is an image.

8. The method of claim 6, wherein the visual resource is a video clip.

9. The method of claim 6, wherein the visual resource is an avatar.

10. The method of claim 6, further comprising modifying the visual resource.

11. A method for providing resources of participants during video conferences, the method comprising:
    waiting, using a hardware processor, for roll call to be initiated;
    determining, using the hardware processor, that a participant using an endpoint is joining a video conference that includes other participants at a plurality of endpoints;
    accessing, using the hardware processor, a visual resource that identifies the participant in response to determining that the participant using the endpoint has joined the video conference;
    determining, using the hardware processor, that video of the participant associated with the endpoint is degraded;
    creating, using the hardware processor, a video roll call of the participants to the video conference that includes the visual resource for each of the participants in response to determining that video of the participant associated with an endpoint is degraded; and
    displaying, using the hardware processor, the video roll call.

12. The method of claim 11, wherein the video roll call is a composite roll call.

13. The method of claim 11, wherein the video roll call is a sequential display of the visual resources.

14. The method of claim 11, wherein at least one of the visual resources is an image.

15. The method of claim 11, wherein at least one of the visual resources is a video clip.

16. The method of claim 11, wherein at least one of the visual resources is an avatar.

17. The method of claim 11, further comprising modifying the visual resource.

18. A non-transitory computer-readable medium containing computer-executable instructions that, when executed by a processor, cause the processor to perform a method for providing resources of participants during video conferences, the method comprising:
    determining that a participant using an endpoint is joining or departing the a video conference that includes other participants at a plurality of endpoints;
    accessing a visual resource that identifies the participant in response to determining that the participant using the endpoint has joined the video conference;
    determining that video of the participant associated with the endpoint is degraded; and
    presenting the visual resource to at least one other participant by replacing the video of the participant during the video conference in response to determining that the video is degraded.

19. The medium of claim 18, wherein the visual resource is an image.

20. The medium of claim 18, wherein the visual resource is a video clip.

21. The medium of claim 18, wherein the visual resource is an avatar.

22. The medium of claim 18, wherein the method further comprises modifying the visual resource.

23. A non-transitory computer-readable medium containing computer-executable instructions that, when executed by a processor, cause the processor to perform a method for providing resources of participants during video conferences, the method comprising:
    determining whether video of a participant is degraded;

accessing a visual resource that corresponds to the participant in response to determining that video of the participant associated with an endpoint is degraded; and presenting the visual resource to at least one other participant by replacing the video of the participant during the video conference.

24. The medium of claim 23, wherein the visual resource is an image.

25. The medium of claim 23, wherein the visual resource is a video clip.

26. The medium of claim 23, wherein the visual resource is an avatar.

27. The medium of claim 23, wherein the method further comprises modifying the visual resource.

28. A non-transitory computer-readable medium containing computer-executable instructions that, when executed by a processor, cause the processor to perform a method for providing resources of participants during video conferences, the method comprising:

waiting for roll call to be initiated;

determining that a participant using an endpoint is joining a video conference that includes other participants at a plurality of endpoints;

accessing a visual resource that identifies the participant in response to determining that the participant using the endpoint has joined the video conference;

determining that video of the participant associated with the endpoint is degraded;

creating a video roll call of the participants to the video conference that includes the visual resource for each of the participants in response to determining that video of the participant associated with an endpoint is degraded; and displaying the video roll call.

29. The medium of claim 28, wherein the video roll call is a composite roll call.

30. The medium of claim 28, wherein the video roll call is a sequential display of the visual resources.

31. The medium of claim 28, wherein at least one of the visual resources is an image.

32. The medium of claim 28, wherein at least one of the visual resources is a video clip.

33. The medium of claim 28, wherein at least one of the visual resources is an avatar.

34. The medium of claim 28, wherein the method further comprises modifying the visual resource.

35. A device for providing resources of participants during video conferences, the device comprising:

a processor that determines that a participant using an endpoint is joining or departing the a video conference that includes other participants at a plurality of other endpoints, accesses a visual resource that identifies the participant in response to determining that the participant using the endpoint has joined the video conference determines that video of the participant associated with the endpoint is degraded, and presents the visual resource to at least one other participant by replacing the video of the participant during the video conference in response to determining that the video is degraded.

36. The device of claim 35, wherein the visual resource is an image.

37. The device of claim 35, wherein the visual resource is a video clip.

38. The device of claim 35, wherein the visual resource is an avatar.

39. The device of claim 35, wherein the processor also modifies the visual resource.

40. A device for providing resources of participants during video conferences the device comprising:

a processor that determines that determines whether video of a participant is degraded, accesses a visual resource that corresponds to the participant in response to determining that video of the participant associated with an endpoint is degraded, and presents the visual resource to at least one other participant by replacing the video of the participant during the video conference.

41. The device of claim 40, wherein the visual resource is an image.

42. The device of claim 40, wherein the visual resource is a video clip.

43. The device of claim 40, wherein the visual resource is an avatar.

44. The device of claim 40, wherein the processor also modifies the visual resource.

45. A device for providing resources of participants during video conferences, the device comprising:

a processor that waits for roll call to be initiated, determines that a participant using an endpoint is joining a video conference that includes other participants at a plurality of endpoints, accesses a visual resource that identifies the participant in response to determining that the participant using the endpoint has joined the video conference, and determines that video of the participant associated with the endpoint is degraded, creates a video roll call of the participants to the video conference that includes the visual resource for each of the participants in response to determining that video of the participant associated with an endpoint is degraded and causes the video roll call to be displayed.

46. The device of claim 45, wherein the video roll call is a composite roll call.

47. The device of claim 45, wherein the video roll call is a sequential display of the visual resources.

48. The device of claim 45, wherein at least one of the visual resources is an image.

49. The device of claim 45, wherein at least one of the visual resources is a video clip.

50. The device of claim 45, wherein at least one of the visual resources is an avatar.

51. The device of claim 45, wherein the processor also modifies the visual resource.

* * * * *